United States Patent
Duong et al.

(10) Patent No.: US 12,164,811 B2
(45) Date of Patent: *Dec. 10, 2024

(54) CONCURRENT COMMAND LIMITER FOR A MEMORY SYSTEM

(71) Applicant: MICRON TECHNOLOGY, INC., Boise, ID (US)

(72) Inventors: Jason Duong, Milpitas, CA (US); Fangfang Zhu, San Jose, CA (US); Jiangli Zhu, San Jose, CA (US); Juane Li, Milpitas, CA (US); Chih-Kuo Kao, Fremont, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/531,329

(22) Filed: Dec. 6, 2023

(65) Prior Publication Data

US 2024/0126480 A1    Apr. 18, 2024

Related U.S. Application Data

(63) Continuation of application No. 17/459,343, filed on Aug. 27, 2021, now Pat. No. 11,893,280.

(51) Int. Cl.
G06F 3/06 (2006.01)
(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | |
|---|---|---|
| 2001/0008007 A1 | 7/2001 | Halligan et al. |
| 2013/0159556 A1 | 6/2013 | Mizumaki |
| 2013/0262762 A1 | 10/2013 | Igashira et al. |
| 2018/0232178 A1 | 8/2018 | Iwaki et al. |
| 2020/0210104 A1* | 7/2020 | Grosz .................. G06F 3/0659 |
| 2022/0129193 A1 | 4/2022 | Hill et al. |
| 2023/0028617 A1 | 1/2023 | Ogawa |

* cited by examiner

*Primary Examiner* — Khoa D Doan
*Assistant Examiner* — Tong B. Vo
(74) *Attorney, Agent, or Firm* — LOWENSTEIN SANDLER LLP (57) ABSTRACT

A system can include a memory device and a processing device coupled with the memory device. The processing device can receive, from a host system, a command of a type; determine a weighted count of the command according to the type of the command; track, based on the weighted count, a first count of commands of the type; determine whether the first count of commands of the type satisfies a threshold criterion for commands of the type; and responsive to determining that the first count of commands of the type satisfies the threshold criterion, transmit a notification to the host system to refrain from transmitting commands of the type.

20 Claims, 7 Drawing Sheets

FIG. 7

CONCURRENT COMMAND LIMITER FOR A MEMORY SYSTEM

RELATED APPLICATIONS

This application is a continuation of U.S. patent application Ser. No. 17/459,343, filed Aug. 27, 2021, the entire contents of which is hereby incorporated by reference herein.

TECHNICAL FIELD

Embodiments of the disclosure relate generally to memory sub-systems, and more specifically, relate to a concurrent command limiter for a memory system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to a concurrent command limiter for a memory system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Other examples of non-volatile memory devices are described below in conjunction with FIG. 1. A non-volatile memory device is a package of one or more dies. Each die can consist of one or more partitions. For some types of non-volatile memory devices (e.g., 3D cross-point devices), each partition consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A partition hereinafter refers to a unit of the memory device used to store data and can include a group of memory cells, a wordline group, a wordline, or individual memory cells.

Certain non-volatile memory devices (e.g., a three-dimensional cross-point memory device) can be limited by a maximum number of commands they can execute concurrently. For example, memory devices can receive commands from a host system or a memory sub-system controller coupled with the memory device—e.g., receive read commands, write command, access commands, etc. The host system can continually transmit commands to execute an operation. The memory device can be limited in how many commands it can process from the host system. The memory device can also be limited in how many commands it can execute at the same time. For example, the memory device can execute one read operation instead of two read operations concurrently. Accordingly, the memory devices can receive more commands (e.g., commands for access operations, read operations, write operations, etc.) than they can process and execute. For example, the memory device can receive multiple commands but be limited to process a few of them for execution. Accordingly, the memory device can fail to correctly process and execute commands received after reaching the maximum number of commands.

Certain memory device can notify the host system a status of a given command—e.g., that the command is executed or complete. When a command fails in certain situations, the memory device can fail to notify a sender of the commands that the command has failed or the memory device can notify the sender too slowly. That is, the host system can be unaware that a command has failed or not yet been processed by the memory device. To have the failed commands be executed, the host system can resend (e.g., retry) the failed command. Without knowledge of the fail or if the notification of the fail is too late, the host system can fail to resend the commands or slow down the performance of the system.

Aspects of the present disclosure address the above and other deficiencies by providing a memory sub-system that can limit a number of commands received to avoid receiving excess commands. For example, the memory sub-system controller can include logic that processes and limits commands received. The memory sub-system controller can include a counter that tracks a number of commands the memory device has received and is processing and executing at a given time. The memory sub-system controller can also include a table that expects (e.g., predicts or anticipates) when a given command is executed and complete. The memory sub-system controller can decrease the number at the counter when the table expects the command to be executed. Accordingly, the memory sub-system controller can keep an accurate count of the number of commands the memory device is currently processing and executing. Further, the memory sub-system controller can be programmed with several limits, where each limit is associated with whether the memory sub-system can process another command given the current command count. Accordingly, the memory sub-system can compare the current command count with the limits. If the memory sub-system determines the command count does not exceed a given limit, the memory sub-system can execute the next received command normally. If the memory sub-system determines the command count matches the command limit, the memory sub-system can notify the sender (host device or memory sub-system controller). Accordingly, the sender can wait to transmit additional messages.

Advantages of the present disclosure include, but are not limited to, avoiding command failures due to the memory subsystem reaching the limit. The sender can be aware a memory sub-system is at a limit and avoid sending additional commands. This can prevent commands from being unexecuted and prevent the sender from having to resend the commands that fail. Accordingly, the memory sub-system can increase the performance.

Figure 1:
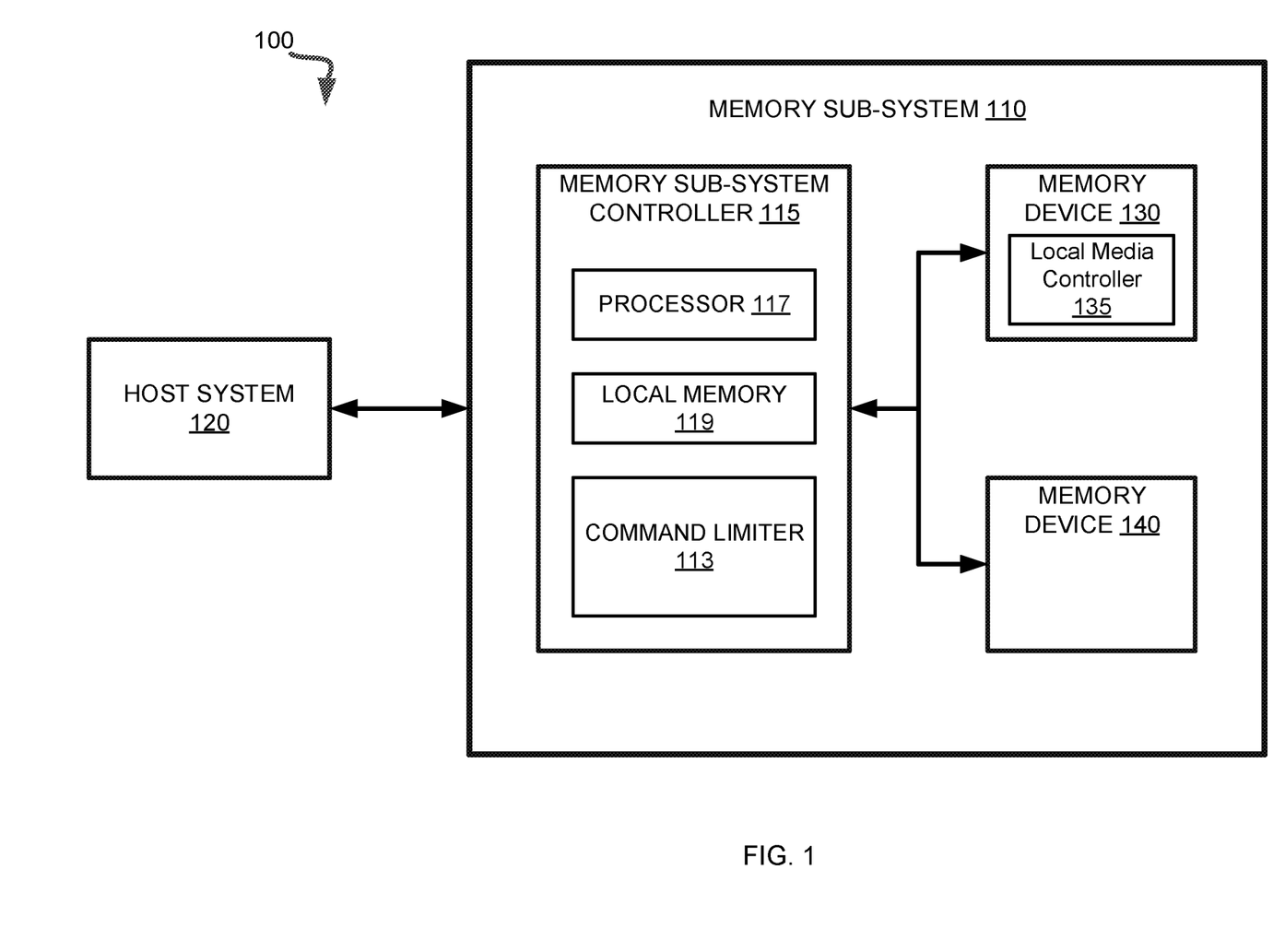
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a command limiter component 113 that can allow the memory sub-system 110 to limit a number of commands received from host system 120. In some embodiments, the memory sub-system controller 115 includes at least a portion of the command limiter component 113. In some embodiments, the command limiter component 113 is part of the host system 110, an application, or an operating system. In other embodiments, local media controller 135 includes at least a portion of command limiter component 113 and is configured to perform the functionality described herein.

The command limiter component 113 can process commands received from host system 120. In some embodiments, the command limiter component 113 can track a number of each command type (e.g., read, write, force write commands) received from the host system 120 that the memory sub-system 110 is still executing—e.g., commands that are not finished or complete. The command limiter component 113 can track the number of commands at a counter. The command limiter component 113 can also include an expectation completion table logic and anticipate when a respective command is to be complete. Accordingly, the command limiter component 113 can decrease the value at the counter when the expectation completion table logic indicates a command will be complete. The command limiter component 113 can include logic that compares the value at the counter with a predetermined command limit of the memory sub-system 110 to determine whether the value of the counter satisfies a threshold criterion. If the command limiter component 113 determines the value at the counter meets or exceeds the limit (i.e., satisfies the threshold criterion), the command limiter 113 can send a notification to the host system 120. If the command limiter component 113 determines the value at the counter is below the limit (i.e., does not satisfy the threshold criterion), the command limiter component 113 can allow the memory sub-system 110 to continue receiving commands. Further details with regards to the operations of the command limiter component 113 are described below.

Figure 2:
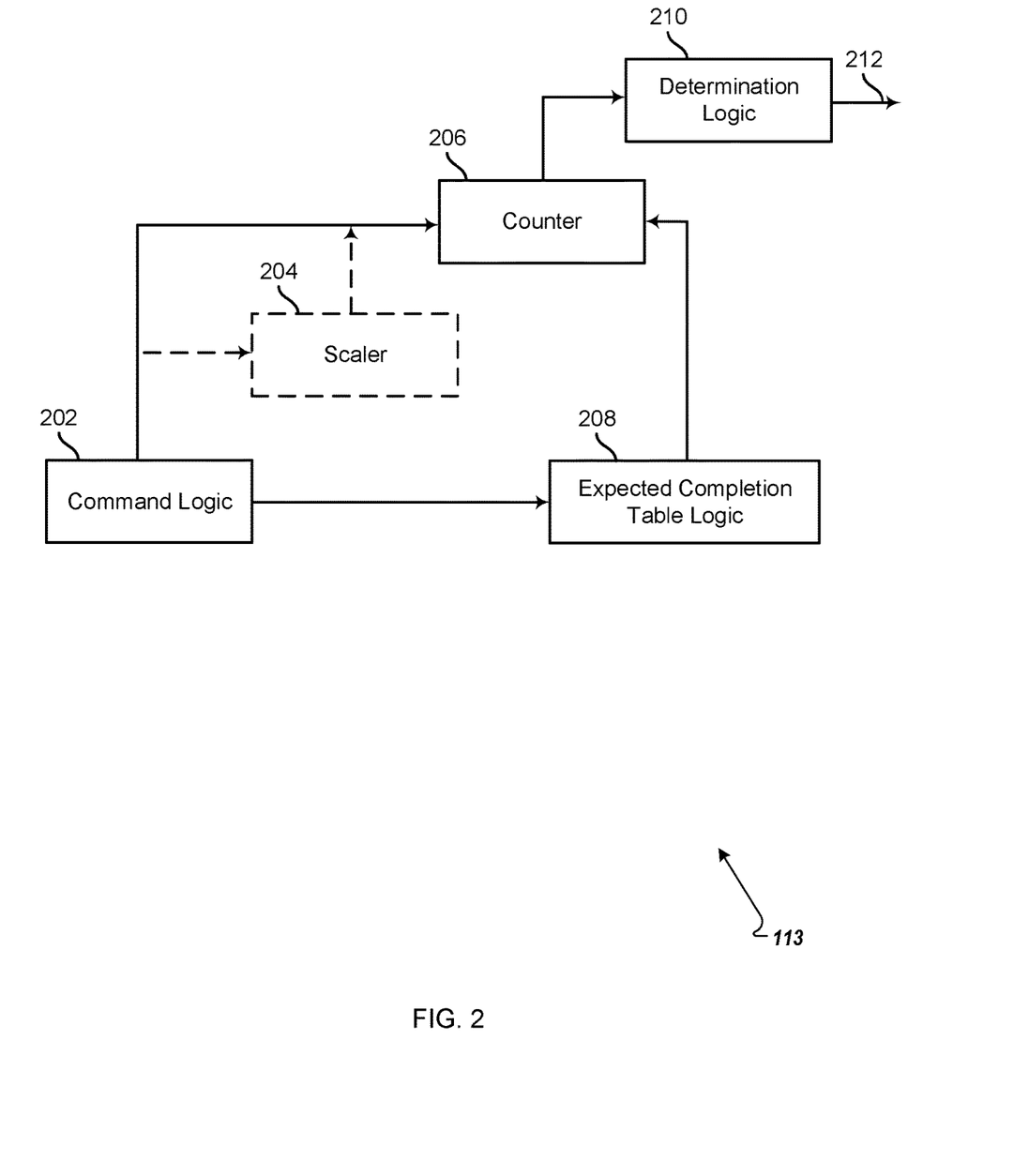
FIG. 2 is a block diagram of an example command limiter in accordance with some embodiments of the present disclosure.

FIG. 2 is a block diagram of an example command limiter 113, in accordance with some embodiments of the present disclosure. In one embodiment, command limiter 113 is implemented within memory sub-system controller 115, as described with reference to FIG. 1. Command limiter 113 can include command logic 202, an optional scaler 204, a counter 206, an expected completion table logic 208, and determination logic 210. Command limiter 113 can also an output notification 212. Command limiter 113 can limit commands received from host system 120 to ensure the host system 120 does not send excess commands the memory sub-system 110 cannot handle.

Command logic 202 can be configured to receive commands. In at least one embodiment, the command logic 202 can receive commands sent from host system 120. In some examples, the command logic 202 can receive access commands, write commands, force write commands, read commands, etc. that are associated with operations at memory device 130. The command logic 202 can transmit (e.g., forward) the command received to the counter 206 and the expected completion table logic 208. In at least one embodiment, the command logic 202 can transmit the command to the scaler 204.

Scaler 204 can be configured to change or adjust a way a received command is counted. For example, the scaler 204 can weigh (multiply, factor, cause one command to be counted greater than another command) the command received from the command logic 202. In at least one embodiment, some commands received can take up more resources in the memory sub-system 110 than other commands. For example, a command can take longer to execute (e.g., take more clock cycles to complete), can utilize more memory or processing power, and/or slow down the performance of the memory sub-system 110—e.g., a forced write command can take longer to execute than a read command or a write command. Accordingly, to limit commands that utilize more resources, the command logic 202 can include the scaler 204 to weigh the count of the command. For example, the scaler 204 can receive one (1) command from command logic 202 and indicate a count or number of commands to the counter 206 that are greater than one—e.g., the scaler 202 could receive one (1) force write command and indicate to the counter 206 to count the command as two (2). Accordingly, the counter 206 can reach a maximum limit of commands more rapidly when a certain type of command is received and indicate to the host system 120 to stop transmitting such commands. This can enable the memory sub-system 110 to limit the more demanding commands and improve the overall performance of the memory sub-system 110.

Counter 206 can include logic or other peripheral components to track the number of commands received from the host device 120 that the memory sub-system 110 is still executing. In at least one embodiment, the counter 206 can track a weighted count of the commands received based on the scaler 204 outputs. In some embodiments, counter 206 can represent several individual counters. In such embodiments, there can be a different counter 206 for each type of command—e.g., a counter 206 for received read commands, a counter 206 for received write commands, a counter 206 for received force write commands, etc. Counter 206 can be configured to increase in value (e.g. be incremented) each time an indication is received from command logic 202 or scaler 204—e.g., each time a command is received from host system 120. In some embodiments, counter 206 can be configured to decrease in value (e.g., be decremented) each time an indication is received from expected completion table logic 208—e.g., each time memory sub-system 110 executes a command. Accordingly, counter 206 can accurately reflect a number of commands of each type the memory sub-system 110 is currently executing at a given time.

Expected completion table logic 208 can be configured to indicate to counter 206 when a received command from host system 120 should be competed. That is, expected completion table logic 208 can be utilized to indicate when a received command is expected to be complete. For example, expected completion table logic 208 can receive a command from command logic 202. The expected completion table logic 208 can then transmit an indication to counter 206 the command received should be complete after a certain number of clock cycles of memory sub-system 110 has elapsed. In some embodiments, expected completion table logic 208 can determine when a command should be complete based on memory sub-system specifications. That is, each operation executed at memory sub-system 110 can be completed in a pre-determined amount of time given the memory sub-system 110 processing speed, memory capacity, operation system limits—e.g., based on bus speeds, speed of the memory cell within memory device 130, and the processor's clock speed. Accordingly, the expected completion table logic 208 can be programmed with an amount of time each operation should be executed in—e.g., an amount of clock cycles each operation should be executed in. For example, the expected completion table logic 208 can be programmed with a number of clock cycles each read operation received at memory sub-system 110 should be executed in. In at least some embodiments, the expected completion table logic 208 can be programmed with an amount of time it will take to complete a read operation, a write operation, a force write operation, and other access commands. Additional details regarding the expected completion table logic 208 and its components are described with reference to FIG. 3.

Determination logic 210 can be configured to determine whether memory sub-system 110 (e.g., memory sub-system controller 115) can receive additional commands. That is, determination logic 210 can indicate whether memory sub-system 110 has met or exceeded the maximum number commands it can process at a given time (e.g., satisfied the maximum number of commands). In at least some embodiments, the determination logic 210 can compare a value of a respective counter with a limit—e.g., a maximum number of additional commands the memory sub-system 110 can execute. In such embodiments, determination logic 210 can be programmed with the limit by the memory sub-system controller 115. The limit of memory sub-system 110 can be based on the memory sub-system 110 processing speed, memory capacity, operation system limits. In at least some embodiments, the limit of memory sub-system 110 can be based on a number of commands of each type the memory sub-system 110 is currently executing. For example, the memory sub-system 110 can execute a maximum number of read commands or a maximum number of write commands concurrently given the processing speed, memory capacity, operation system limits. When the memory sub-system 110 is already executing a number of read commands, the number of additional write commands the memory sub-system 110 can concurrently execute with the read commands decreases from the maximum number of write commands the memory sub-system 110 can execute—e.g., the more read commands the memory sub-system 110 is currently executing, the less additional write commands the memory sub-system 110 can execute. Similarly, the more write commands the memory sub-system 110 is currently executing, the less additional read commands the memory sub-system 110 can execute. Accordingly, for each current number of read commands or current number of write commands, there may be a limit on how many commands of the other type the memory sub-system can execute. For example, if the memory sub-system is currently executing a first number of writes, there may be a limit of an additional second number of reads the memory sub-system 110 can receive.

The determination logic 210 can be programmed with the limits at each number of a given command as described with reference to FIG. 4. Accordingly, the determination logic 210 can determine a respective limit on a number of additional commands the memory sub-system 110 can receive given a value of a first counter 206. The determination logic 210 can then compare the respective limit with the value of the respective counter 206 to determine if the memory sub-system 110 can receive additional commands. For example, the determination logic 210 can compare the read limit with the current read count to determine if the memory sub-system 110 can receive additional read commands. Additional details regarding the determination logic 210 comparing the limits and current counter values are described with reference to FIG. 4.

If the determination logic 210 determines the memory sub-system 110 has reached the maximum number of commands it can execute, the determination logic 210 can generate an indication 210 that notifies the host system 120 to stop transmitting additional commands. If the determination logic 210 determines the memory sub-system 110 can receive additional commands, the determination logic 210 can refrain from notifying the host system 120 to stop transmitting commands—e.g., the memory sub-system 110 can proceed as normal to execute the received command from the host system 120. In some embodiments, the determination logic 210 can transmit a notification for each command type. For example, the determination logic 210 can transmit a notification to the host system 120 to refrain from transmitting additional read commands if the read limit is less than the current read count.

Figure 3:
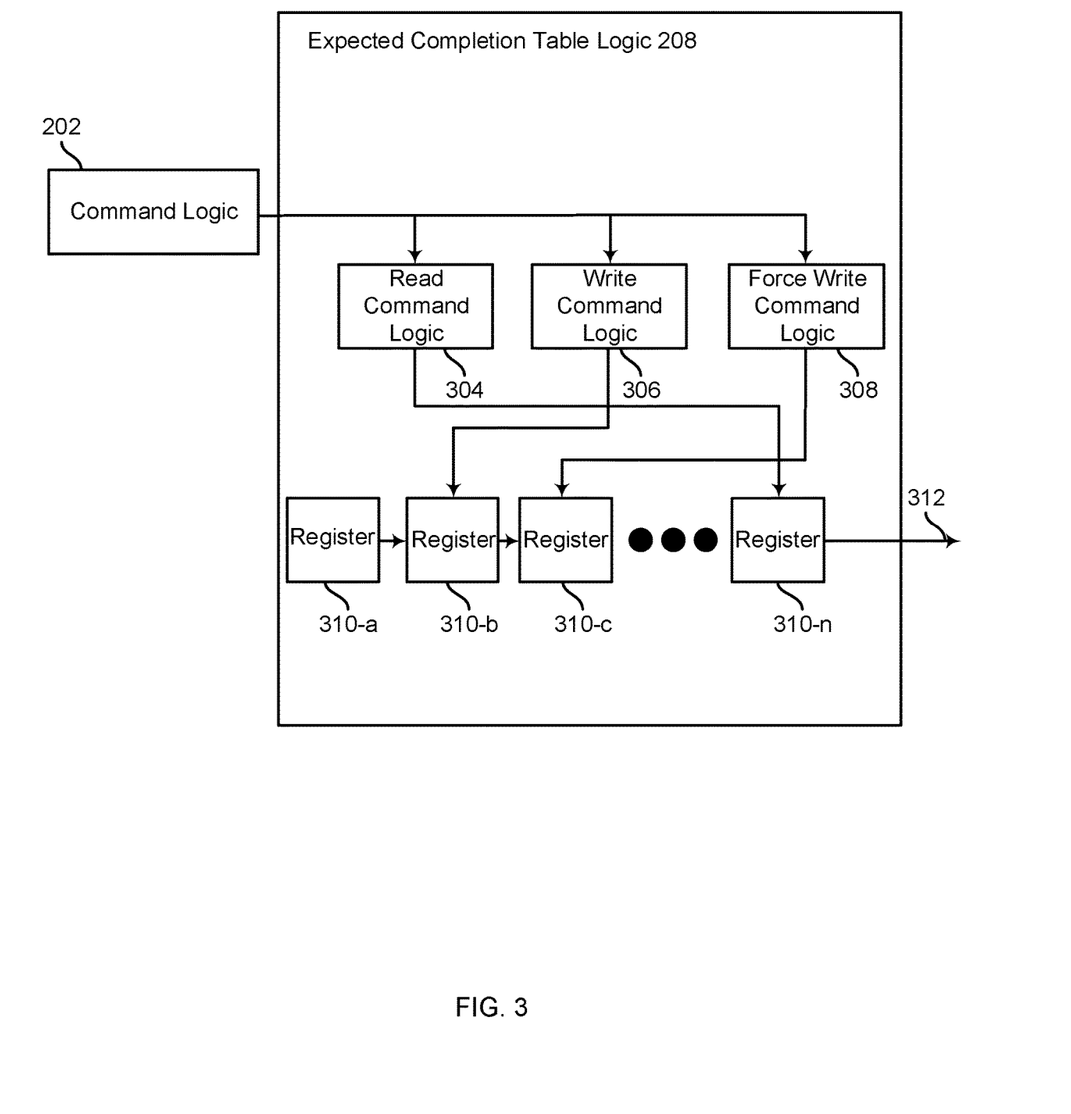
FIG. 3 is block diagram of an example expected completion table logic in accordance with some embodiments of the present disclosure.

FIG. 3, is a block diagram of an example expected completion table logic 208, in accordance with some embodiments of the present disclosure. In one embodiment, expected completion table logic 208 is implemented within command limiter component 113, as described with reference to FIG. 2. Expected completion table logic 208 can include read command logic 304, write command logic 306, and force write command logic 308. In at least some embodiments, expected completion table logic 208 can include additional command logic associated with other commands—e.g., other access commands. Expected completion table logic 208 can include registers 310. The expected completion table logic 208 can be coupled with command logic 202. Expected completion table logic 208 can notify counter 206 of when a received command should be complete.

Read command logic 304 can be configured to receive read commands from command logic 202. In at least some embodiments, read command logic 304 can be programmed with an amount of time a read operation associated with the read command is expected to take. As described with reference to FIG. 2, the amount of time the read operation should take can be based on processing speed, memory capacity, operation system limits of the memory sub-system 110. For example, if the memory sub-system 110 has a relatively high processing speed or memory capacity, the memory sub-system 110 can execute a read operation in a relatively small amount of time. In some embodiments, read command logic 304 can be programmed with a number of clock cycles a read operation is expected to take. In at least on embodiment, the read command logic 304 can write a value to a register 310 based on the number of clock cycles the read operation is expected to take. For example, registers 310 can be examples of shift-level registers. Accordingly, the value stored at a register 310 can shift to a subsequent register each clock cycle. For example, a value stored at register 310-$a$ can shift and be stored at register 310-$b$ after a clock cycle. Because the registers 310 shift values each clock cycle, the read command logic 304 can write a value corresponding to the received read command to a respective register 310, and after the number of clock cycles, the value can be transmitted from the expected completion table logic 208 to the counter 206. For example, if the memory sub-system 110 can execute a read operation in one (1) clock cycle, the read command logic 304 can write a value corresponding to the read command in register 310-$n$. Accordingly, after one (1) clock cycle, the expected completion table logic 208 can output the value 312 and indicate to the counter 206 the read command is executed. If the memory sub-system 110 can execute a read operation in two (2) clock cycles, the read command logic 304 can write a value to register 310-($n$−1), if the memory sub-system 110 can execute a read operation in three (3) clock cycles, the read command logic 304 can write a value to register 310-($n$−2), and so forth.

In some embodiments, write command logic 306 can mirror the operations of read command logic 304 with write commands. For example, write command logic 306 can receive write commands from command logic 202. The write command logic 306 can be programmed with an amount of time it takes the memory sub-system to complete a write operation associated with a write command. Accordingly, the write command logic 306 can write a value to register 310 based on a number of clock cycles it will take to execute the received write command. Similarly, forced write command logic 308 can mirror the operations of read command logic 304 with forced write command—e.g., receive forced write commands from command logic 302 and write a value to a respective register 310 based on the number of clock cycles the memory sub-system 110 takes to execute a forced write operation.

In at least one embodiment, when the expected completion table logic 208 includes read command logic 304, write command logic 306, and forced write logic 308, each register 310 can store three bits. Accordingly, each bit of the three bits stored can indicate whether a read, write, and/or forced write operations is complete in a respective clock cycle. In some embodiments, the first bit can indicate whether a read operation is complete, the second bit can indicate whether a write operation is complete, and the third bit can indicate whether a forced write operation is complete. For example, read command logic 304 can write a value "1" to the first bit of a respective register to indicate a read operation will be complete in that particular clock cycle. Similarly, write command logic 306 can write a value "1" to the second bit of a respective register to indicate a write operation will be complete in that clock cycle and forced write command logic 308 can write a value "1" to the third bit of a respective register to indicate a forced write operation will be complete in that clock cycle. Accordingly, the counter 206 can determine which type of operation is complete in a respective clock cycle based on the value of the three bits transmitted from the expected completion table logic 208—e.g., a read operation if the value is '100', a write operation if the value is '010', a read and forced write operation if the value is '101' and so forth. In embodiments where additional command logics are included, each register 310 can store additional bits—e.g., if expected completion table logic 208 includes refresh command logic, each register 310 can store four (4) bits.

In some embodiments, the expected completion table logic 208 can receive one command from command logic 302 each clock cycle. Accordingly, the memory sub-system 110 can at most execute one read command, one write command, and one forced write command each clock cycle. That is, the memory sub-system 110 can execute one read, one write, and one forced write each clock cycle not two reads in one clock cycle.

Figure 4:
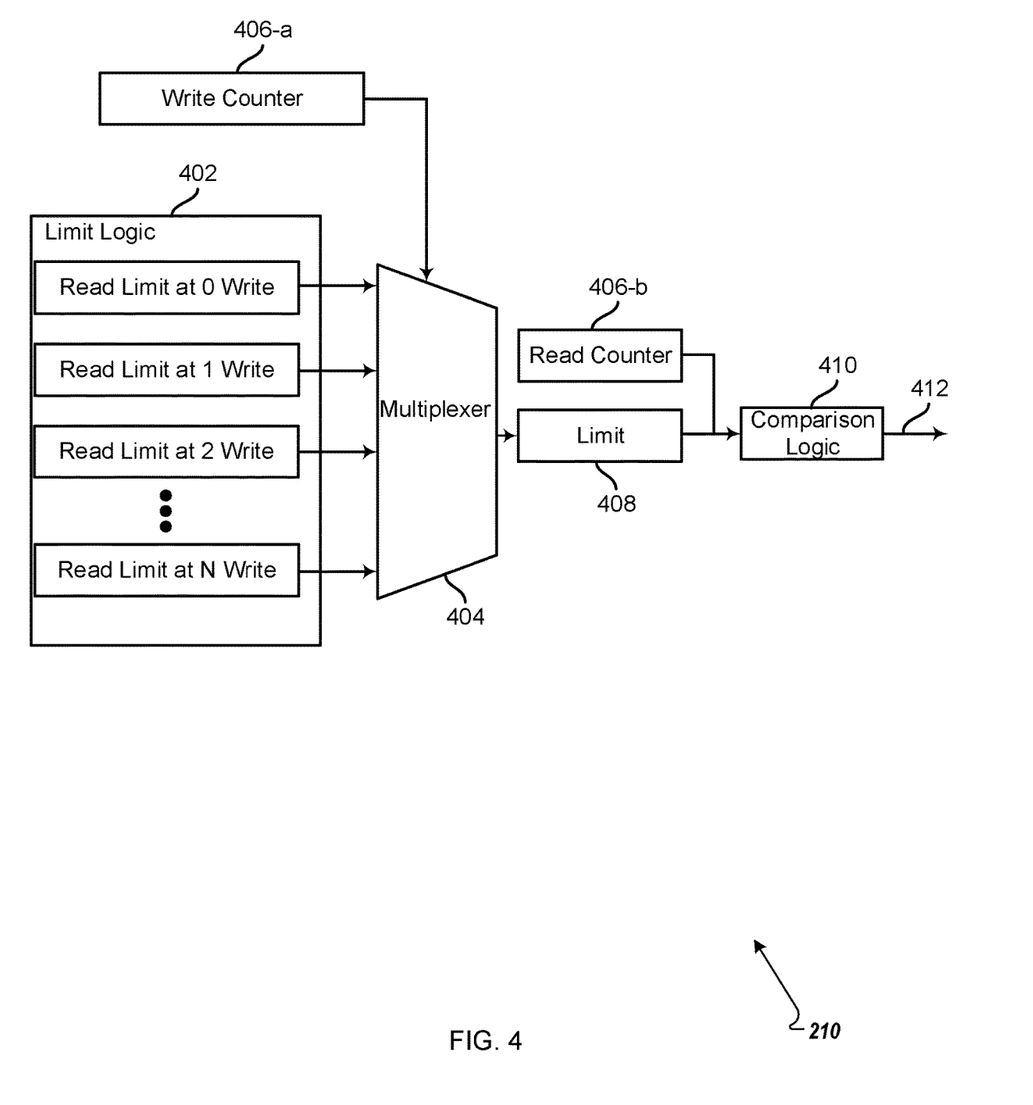
FIG. 4 is a block diagram of an example determination logic in accordance with some embodiments of the present disclosure.

FIG. 4 is a block diagram of an example determination logic 210, in accordance with some embodiments of the present disclosure. In one embodiment, determination logic 210 is implemented within command limiter component 113, as described with reference to FIG. 2. Determination logic 210 can include limit logic 402, multiplexer 404, and comparison logic 410. The determination logic 210 can be coupled with counters 406. For example, determination logic 210 can be coupled with write counter 406-a and read counter 406-b. Counters 406 can be examples of counters 206 as described with reference to FIG. 2. Determination logic 210 can generate output 412 to notify host system 120 that the memory sub-system 110 maximum command limit is met (e.g., satisfied).

Limit logic 402 can be configured to store a limit of how many additional commands the memory sub-system 110 can receive and execute given a current command count. In some embodiments, limit logic 402 can store a limit of how many commands of one kind can be received given the memory sub-system 110 is already executing commands of a second kind. For example, limit logic 402 can be configured to store how many additional read commands the memory sub-systems 110 can receive or execute given a specific write count—e.g., how many read commands the memory sub-system 110 can receive given an "N" number of writes already being executed by the memory sub-system 110. In at least some embodiments, limit logic 402 can be an example of a table, a register, or other logical component configured to store the limits. In some embodiments, the limit logic 402 can store additional limits for other commands types. For example, the limit logic 402 can include a write limit at an "N" number of reads, a forced write limit at an "N" number of reads, a write limit at an "N" number of writes, etc. In some embodiments, the determination logic 210 can include a separate limit logic 402 for each possible command type combination. The limit logic 402 can be configured to output the limits to the multiplexer 404.

Multiplexer 404 can be configured to receive each limit and a value from write counter 406-a to output a current limit 408 of the number of additional commands the memory sub-system can execute. For example, multiplexer 404 can receive how many write operations the memory sub-system 110 is currently executing from the write counter 406-a. The multiplexer 404 can then select a limit from limit logic 402 based on receiving the current number of write operations—e.g., select read limit at 0 write if the write counter 406-a transmits a value "0".

Comparison logic 410 can be configured to receive the limit 408 and a value from read counter 406-b to determine if the memory sub-system 110 is at a maximum command threshold—e.g., determine if the memory sub-system 110 can receive any additional commands given the current number of commands the memory sub-system 110 is executing. For example, comparison logic 410 can compare the value from counter 406-b and the limit 408. If the comparison logic 410 determines the limit 408 is greater than the current number of read operations (e.g., the value from read counter 406-b), the determination logic 210 can refrain from notifying the host system 120 that the maximum number of commands the memory sub-system 110 has been met. That is, the memory sub-system 110 can receive and execute additional read commands as the limit of read commands at the current number of writes is not yet met. If the comparison logic 410 determines the limit 408 is less than or equal to the current number of read operations (e.g., the value from read counter 406-b), the determination logic 210 can notify the host system 120 that the maximum number of read commands the memory sub-system 110 can execute has been met. That is, the memory sub-system 110 cannot receive and execute additional read commands as the limit of read commands at the current number of writes is satisfied. Accordingly, the host system 110 can refrain from transmitting additional commands when the host system 110 receives the notification 412 from the determination logic 210.

In some examples, the determination logic 210 can included additional multiplexers 404 and comparison logics 410 for each command combination—e.g., an additional multiplexer 404 for receiving read limits at an "N" number of forced write commands and an additional comparison logic 410 to compare the current read count value with the forced write limit.

Figure 5:
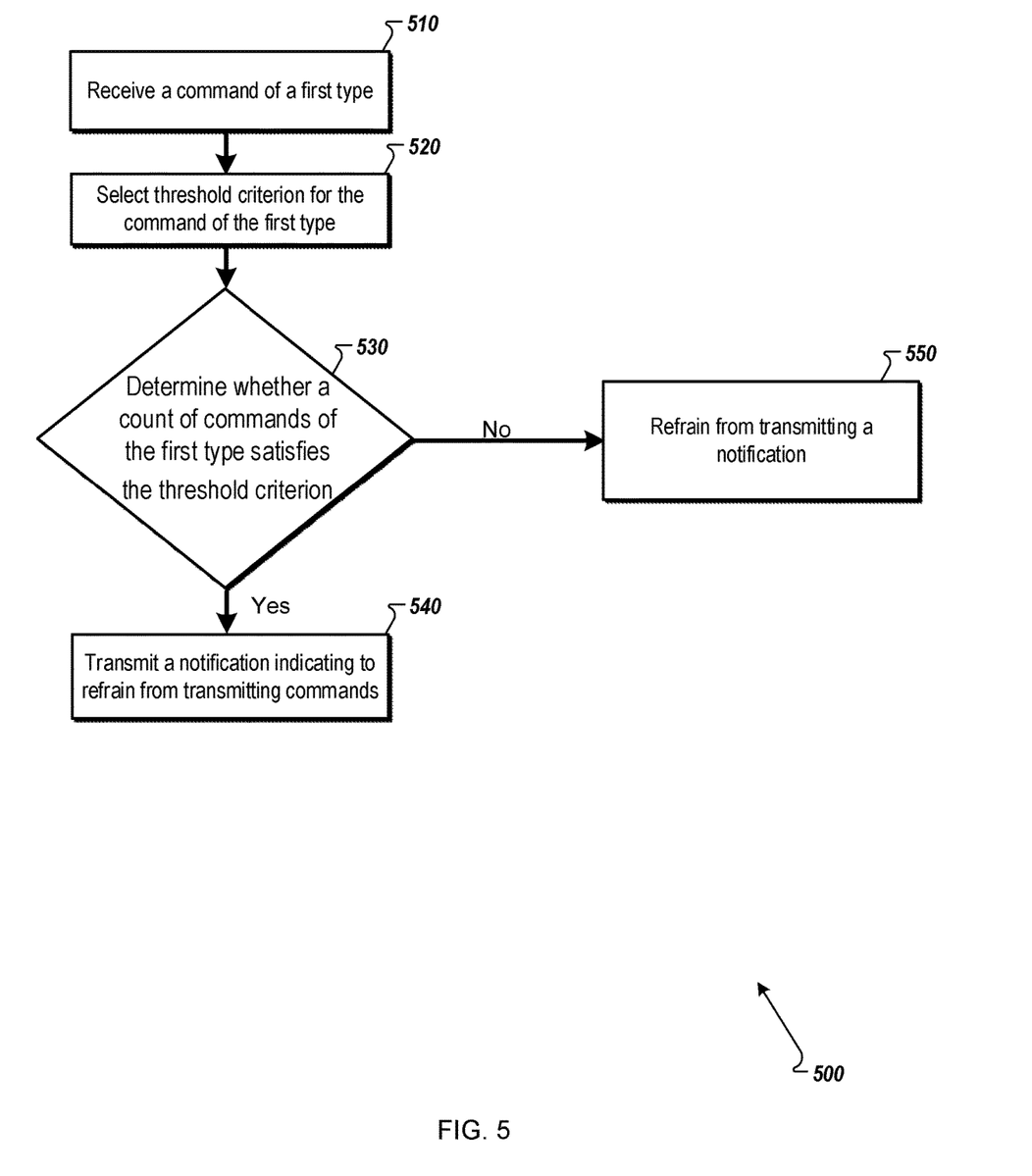
FIGS. 5 and 6 are flow diagrams of example methods for a concurrent command limiter in accordance with embodiments of the present disclosure.

FIG. 5 is a flow diagram of an example method 500 to limit commands transmitted to a memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the command limiter component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic can receive a command of a first type. The command can be sent from host system 120, memory sub-system 115, or another device. In at least one embodiment, the command of the first type can include a write command, a read command, a force write command, etc.

At operation 520, the processing logic can select a threshold criterion for the command of the first type. In some embodiments, the memory sub-system 110 can be limited in a number of commands it can execute concurrently. Each additional command received by the memory sub-system 110 can decrease the number of additional commands it can receive or execute. As described with reference to FIGS. 2 and 4, the memory sub-system 110 can be programmed with limits (e.g., threshold criterion) corresponding to how many commands of a first type it can execute given it is already executing a number of commands of a second type. For example, limit logic 402 can store how many read commands the memory sub-system 110 can execute given it is already executing an "N" number of writes. Accordingly, the command limiter 113 can track the number of writes the memory sub-system 110 is performing at a write counter 406-a. Each time a read command is received, the determination logic 210 can select a read limit based on the write count at write counter 406-a—e.g., select a read limit corresponding to "1" write if the write counter has a count (1). The memory sub-system 110 can include additional tables for other command types, e.g., force write commands limits given a number of reads or writes being executed at the memory sub-system 110.

At operation 530, the processing logic can determine whether a count of commands of the first type satisfies the selected threshold criterion. In at least one embodiment, the processing logic can track the number of read commands the memory sub-system is currently executing. For example, each time a read command is received the memory sub-system can increase the read count at a read counter 406-b. In at least some embodiments, the read count can be weighted. That is, the processing logic can count each received read command as being greater than one (1). In other examples, the processing logic can weigh the count of write commands or forced write commands—e.g., to reach a limit for the respective command faster to reduce the host system 120 from transmitting the respective command and slowing down the performance. In some embodiments, the processing logic can also decrease the read count each time a read command is expected to be complete. As described with reference to FIG. 3, the processing logic can write a value indicating the read command is received to a register 310. The processing logic can select a register 310 to write the value to based on a number of clock cycles the read command will take. For example, processing logic can write the value to register 310-n if the read command will be executed in one (1) clock cycle or to register 310 n−1 if the read command will take (n) clock cycles to execute. Because the registers are shift level registers and transfer their value to a subsequent register (e.g., to a register physically adjacent) each clock cycle, the processing logic can transmit the value to the counter after the number of clock cycles to execute the read command are complete. Accordingly, the processing logic can accurately record the current number of read commands the memory sub-system 110 is executing. The processing logic can compare the current read count to the selected threshold criterion—e.g., the selected limit.

At operation 540, if the processing logic determines the count of the commands of the first type satisfies the threshold criterion, the processing logic can transmit a notification to host system 120 indicating the host system 120 should refrain from transmitting additional read commands to the memory sub-system 110. For example, if the read count is the same as or exceeds the threshold criterion, the processing logic can transmit the notification. As described with reference to FIG. 2, when the memory sub-system 110 satisfies the threshold criterion, the memory sub-system 110 can fail to process additional commands received. Accordingly, notifying the host system 120 that the threshold criterion is satisfied can allow the memory sub-system 110 to avoid receiving excess commands.

At operation 550, if the processing logic determines the count of the commands of the first type fails to satisfy the threshold criterion, the processing logic can refrain from transmitting a notification to host system 120. For example, if the read count is the less than the threshold criterion, the processing logic can refrain from transmitting the notification. Because the threshold criterion is not satisfied, the memory sub-system 110 can receive additional commands. Accordingly, the processing logic will not transmit a notification to the host system 120 to refrain from transmitting additional commands.

Figure 6:
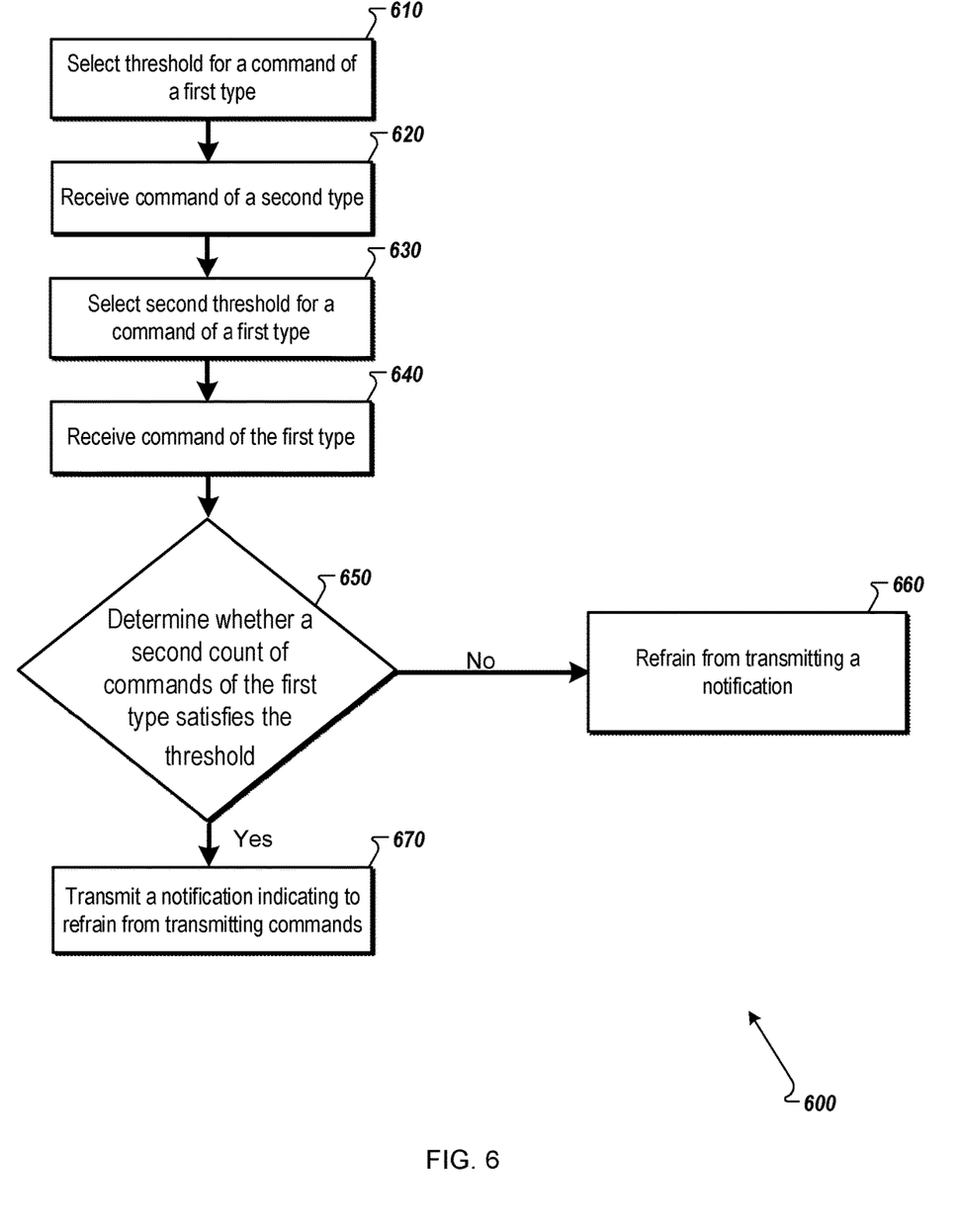

FIG. 6 is a flow diagram of an example method 600 to limit commands transmitted to a memory sub-system in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the command limiter component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic can select a threshold criterion for a command of a first type. As described with reference to operation 520 of FIG. 5, the memory sub-system 110 can be limited in a number of commands it can execute concurrently. Accordingly, the memory sub-system 110 can be programmed with limits (e.g., threshold criterion) corresponding to how many commands of a first type it can execute given it is already executing a number of commands of a second type. In some embodiments, commands of the first type or second type can be read or write operations. For example, limit logic 402 can store how many read commands the memory sub-system 110 can execute given it is already executing an "N" number of writes. Accordingly, the command limiter 113 can track the number of writes the memory sub-system 110 is performing at a write counter 406-a. The memory sub-system 110 can select a read limit based on the write count at counter 406-a.

At operation 620, the processing logic can receive a command for a second type. For example, the memory sub-system can receive a read command or a write command from the host system—e.g., the first type can be reads and the second type can be writes.

At operation 630, the processing logic can select a second threshold criterion for the command of the first type. In some embodiments, the memory sub-system controller can update the write counter 406-a based on receiving the write command at operation 620. For example, the memory sub-system controller can increase the write count by one (1) at write counter 406-a when receiving the command. In some embodiments, the memory sub-system controller can increase the write count by more than one if the memory sub-system controller is using a weighted count as described with reference to the scaler 204 of FIG. 2. Because the memory sub-system controller updates the write count, the memory sub-system controller can select a second threshold criterion for the command of the first type—e.g., for the read command. That is, the number of write commands the memory sub-system is executing increases, causing the memory sub-system to execute fewer read commands.

Accordingly, the memory sub-system controller can select a new threshold criterion (e.g., a new read limit) based on the increased write count.

At operation 640, the processing logic can receive the command of a first type. The command can be sent from host system 120, memory sub-system 115, or another device. In at least one embodiment, the command of the first type can include a write command, a read command, a force write command, etc.

At operation 650, the processing logic can determine whether a second count of commands of the first type satisfies the selected threshold criterion. In at least one embodiment, the processing logic can track the number of read commands the memory sub-system is currently executing as described with reference to operation 530 of FIG. 5. Accordingly, the processing logic can compare the current read count to the selected second threshold criterion—e.g., the selected limit.

At operation 670, if the processing logic determines the count of the commands of the first type satisfies (e.g., meets or exceeds) the second threshold criterion, the processing logic can transmit a notification to host system 120 indicating the host system 120 should refrain from transmitting additional read commands to the memory sub-system 110. For example, if the read count is the same as or exceeds the threshold criterion, the processing logic can transmit the notification.

At operation 660, if the processing logic determines the count of the commands of the first type fails to satisfy the threshold criterion, the processing logic can refrain from transmitting a notification to host system 120. For example, if the read count is the less than the threshold criterion, the processing logic can refrain from transmitting the notification. Because the threshold criterion is not satisfied, the memory sub-system 110 can receive additional commands. Accordingly, the processing logic will not transmit a notification to the host system 120 to refrain from transmitting additional commands. In some embodiments, after refraining from sending the notification to the host system 120, the processing logic can select a third threshold criterion for the command of the second type. For example, because the processing logic updates the read count while performing operation 650, the processing logic can use the updated read count to select a write limit for incoming write commands—e.g., the maximum number of write commands the memory sub-system given its current read count. Accordingly, when the processing logic receives a command of the second type (e.g., a write), the processing logic can determine whether a current count of write commands satisfies (e.g., meets or exceeds) the selected third threshold criterion. If the write count does satisfy the third threshold, the processing logic can transmit the notification to the host system 120 to refrain from transmitting commands. If the write count does not satisfy the third threshold, the processing logic can refrain from transmitting the notification to the host system 120.

Figure 7:
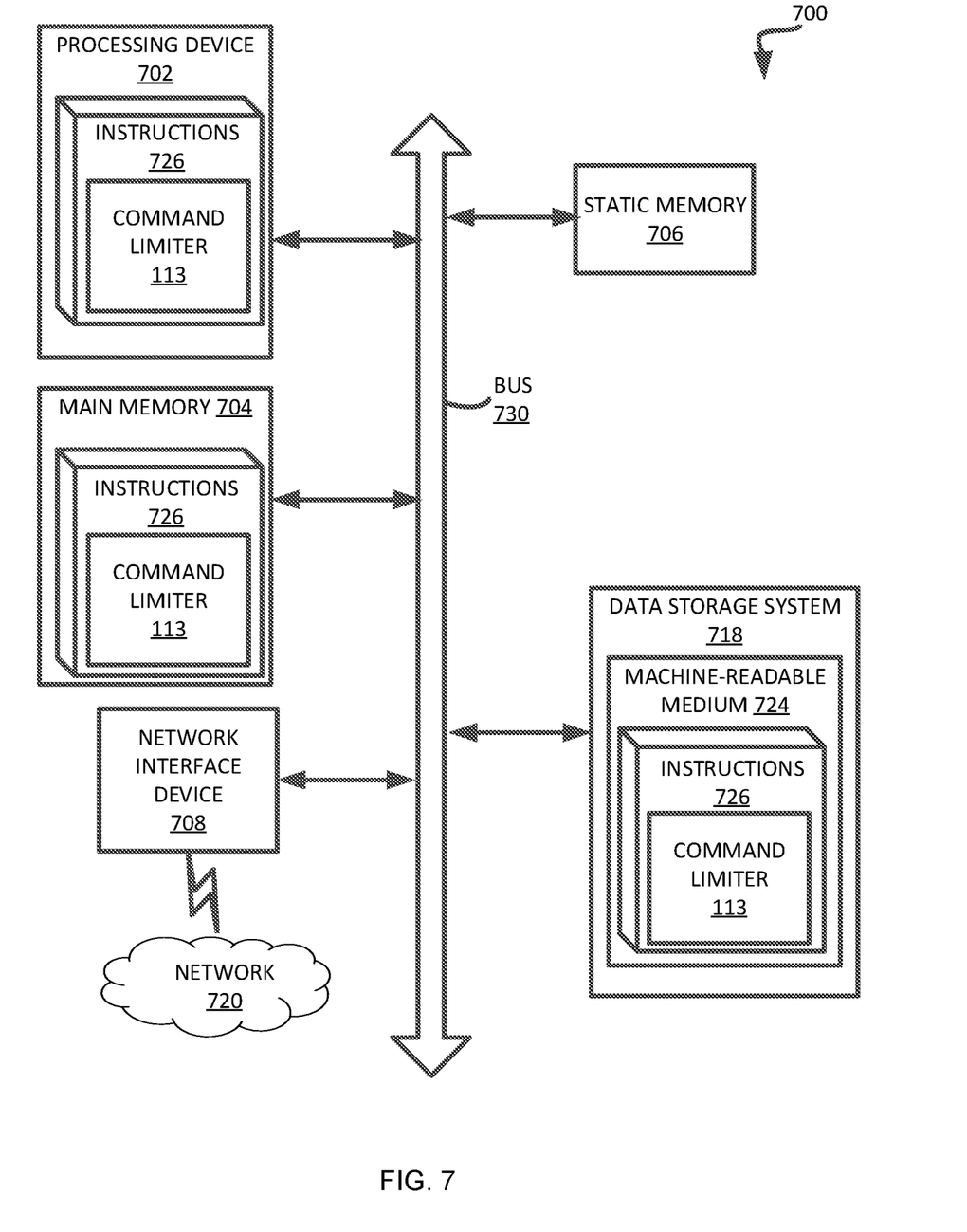
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command limiter component 113 of FIG. 1 to limit commands received). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 608 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a command limiter component 113 (e.g., the command limiter component 113 of FIG. 1) to limit commands received at the processing device 702. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
      receiving, from a host system, a command of a type;
      determining a weighted count of the command according to the type of the command;
      tracking, based on the weighted count, a first count of commands of the type;
      determining whether the first count of commands of the type satisfies a threshold criterion for commands of the type; and
      responsive to determining that the first count of commands of the type satisfies the threshold criterion, transmitting a notification to the host system to refrain from transmitting commands of the type.

2. The system of claim 1, wherein tracking the first count of commands of the type further comprises indicating an amount of time the command is expected to be completed.

3. The system of claim 1, wherein tracking the first count of commands of the type further comprises indicating a number of clock cycles the command is expected to be completed.

4. The system of claim 1, wherein the command of the type comprises an access command, a read command, a write command, or a force write command.

5. The system of claim 1, wherein the operations further comprise:
   responsive to determining that the first count of the commands of the type does not satisfy the threshold criterion, refraining from transmitting the notification to the host system.

6. The system of claim 1, wherein tracking the first count of commands of the type further comprises incrementing a counter associated with commands of the type in response to receiving the command of the type.

7. The system of claim 1, wherein tracking the first count of commands of the type further comprises decrementing a counter associated with commands of the type in response to executing the command of the type or the command of the type being expected to be completed.

8. The system of claim 1, wherein determining that the first count of commands of the type satisfies the threshold criterion for commands of the type further comprises determining that the first count is not less than a threshold number, wherein the threshold number is associated with a second count of commands of a second type.

9. A method comprising:
   receiving, by a processing device, from a host system, a command of a type;
   determining a weighted count of the command according to the type of the command;
   tracking, based on the weighted count, a first count of commands of the type;

determining whether the first count of commands of the type satisfies a threshold criterion for commands of the type; and responsive to determining that the first count of commands of the type satisfies the threshold criterion, transmitting a notification to the host system to refrain from transmitting commands of the type.

10. The method of claim 9, wherein tracking the first count of commands of the type further comprises indicating an amount of time the command is expected to be completed.

11. The method of claim 9, wherein tracking the first count of commands of the type further comprises indicating a number of clock cycles the command is expected to be completed.

12. The method of claim 9, wherein the command of the type comprises an access command, a read command, a write command, or a force write command.

13. The method of claim 9, further comprising:
responsive to determining that the first count of the commands of the type does not satisfy the threshold criterion, refraining from transmitting the notification to the host system.

14. The method of claim 9, wherein tracking the first count of commands of the type further comprises incrementing a counter associated with commands of the type in response to receiving the command of the type.

15. The method of claim 9, wherein tracking the first count of commands of the type further comprises decrementing a counter associated with commands of the type in response to executing the command of the type or the command of the type being expected to be completed.

16. The method of claim 9, wherein determining that the first count of commands of the type satisfies the threshold criterion for commands of the type further comprises determining that the first count is not less than a threshold number, wherein the threshold number is associated with a second count of commands of a second type.

17. A non-transitory computer-readable storage medium comprising instructions that, when executed by a processing device, cause the processing device to perform operations comprising:
receiving, from a host system, a command of a type;
determining a weighted count of the command according to the type of the command;
tracking, based on the weighted count, a first count of commands of the type;
determining whether the first count of commands of the type satisfies a threshold criterion for commands of the type; and
responsive to determining that the first count of commands of the type satisfies the threshold criterion, transmitting a notification to the host system to refrain from transmitting commands of the type.

18. The non-transitory computer-readable storage medium of claim 17, wherein tracking the first count of commands of the type further comprises indicating an amount of time the command is expected to be completed.

19. The non-transitory computer-readable storage medium of claim 17, wherein tracking the first count of commands of the type further comprises indicating a number of clock cycles the command is expected to be completed.

20. The non-transitory computer-readable storage medium of claim 17, wherein the command of the type comprises an access command, a read command, a write command, or a force write command.

* * * * *